US008443432B2

(12) United States Patent
Lu et al.

(10) Patent No.: US 8,443,432 B2

(45) Date of Patent: May 14, 2013

(54) METHOD FOR CALIBRATING A TEMPERATURE FLOAT OF A ONE TIME PASSWORD TOKEN AND A ONE TIME PASSWORD TOKEN THEREOF

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 16 days.

(21) Appl. No.: 13/258,156

(22) PCT Filed: Mar. 28, 2011

(86) PCT No.: PCT/CN2011/072202

§ 371 (c)(1), (2), (4) Date: Sep. 21, 2011

(87) PCT Pub. No.: WO2011/120408

PCT Pub. Date: Oct. 6, 2011

(65) Prior Publication Data

US 2012/0117618 A1 May 10, 2012

(30) Foreign Application Priority Data

Mar. 29, 2010 (CN) .......................... 2010 1 0137414

(51) Int. Cl.

| | |
|---|---|
| ***G06F 7/04*** | (2006.01) |
| ***G06F 12/14*** | (2006.01) |
| ***G06F 11/00*** | (2006.01) |
| ***G06F 21/00*** | (2006.01) |
| ***G06F 17/00*** | (2006.01) |
| ***H04L 29/06*** | (2006.01) |
| ***H04L 9/32*** | (2006.01) |
| ***G06Q 20/00*** | (2012.01) |

(52) U.S. Cl.

USPC ........ 726/9; 726/5; 726/20; 726/34; 713/159; 713/168; 713/172; 713/184; 713/185; 235/375; 705/66

(58) Field of Classification Search .................. 726/2, 5, 726/9, 20, 34; 713/159, 168, 172, 184, 185; 235/375; 705/66

See application file for complete search history.

(56) References Cited

U.S. PATENT DOCUMENTS

| | | | | |
|---|---|---|---|---|
| 2008/0114787 | A1 * | 5/2008 | Kashiyama et al. .......... | 707/100 |
| 2010/0032789 | A1 | 2/2010 | Schoen et al. | |

* cited by examiner

*Primary Examiner* — Aravind Moorthy

(74) *Attorney, Agent, or Firm* — Hammer & Associates, P.C.

(57) ABSTRACT

A method for calibrating a temperature float of a one time password token and a device thereof are provided in the invention relating to the information security field. The method includes steps: the one time password token measures a current ambient temperature at intervals of a first predetermined time, retrieves a data table for a characteristic value relating to the measured temperature, and calibrates a current time value inside the token according to the characteristic value at intervals of a second predetermined time. The one time password token includes a timer module, a measuring module, a retrieving module, a table storing module, a calibrating module, a triggering module, a generating module and a displaying module. The invention calibrates time differentiation of the one time password token caused by the temperature float.

19 Claims, 5 Drawing Sheets

METHOD FOR CALIBRATING A TEMPERATURE FLOAT OF A ONE TIME PASSWORD TOKEN AND A ONE TIME PASSWORD TOKEN THEREOF

FIELD OF THE INVENTION

The invention relates to information security field, especially to a method for calibrating a temperature float of a one time password token and a one time password token thereof.

PRIOR ART

Real-Time Clock is a device providing a host system with time and date in form of Binary-Coded Decimal and of accuracy controlled by an oscillator. A basic function of it is of keeping track on information such as time and date. The oscillator is able to provide a higher accuracy at a fixed frequency. Mostly, Real-time clock applies a crystal of a frequency 32.768 KHz, and a basic frequency 1 Hz is generated for refreshing time and date by dividing frequency output by its oscillator. Accuracy of the real-time clock is mainly dependent on accuracy of the oscillator.

For a time-based one time password token, a time deviation is required to be less than 2 minutes each year, or smaller than 5 ppm. The time deviation is resulted from a parabola change in frequency of an oscillator in case of a change in temperature of the oscillator with frequency 32.768 KHz inside a one time password token. A temperature float of 23 ppm will attribute a one minute or more time deviation monthly, therefore it needs to calibrate time deviation resulted from the temperature float of the one time password token.

SUMMARY OF THE INVENTION

The invention provides a method for calibrating a temperature float of a one time password token, with solutions as follows.

A method for calibrating temperature float of a one time password token, in which the one time password token generates a dynamic factor by a time value and a time step for changing the dynamic factor, and generates and displays a one time password by the dynamic factor, wherein the method comprises steps of measuring its current ambient temperature at intervals of a first predetermined time by the one time password token;

retrieving a data table in terms of the measured temperature and obtaining a corresponding characteristic value by the one time password token; and calibrating the current time value inside the one time password token according to the characteristic value at intervals of the second predetermined time by the one time password token.

A one time password token, wherein it comprises:

a timer module for starting a measuring module to measure a current ambient temperature for the one time password token when reaching the first predetermined time step;

the measuring module for measuring the current ambient temperature for the one time password token, at a time when the timer module accumulates to the first predetermined time step, and triggering a retrieving module to retrieve data;

a table storing module for storing characteristic values of a real-time clock oscillator at different temperatures;

the retrieving module for retrieving a characteristic value relating to the measured temperature in the table storing module according to the current ambient temperature of the one time password token measured by the measuring module;

a calibrating module for calibrating a current time value inside the one time password token according to the characteristic value;

a triggering module for triggering a generating module to generate a one time password;

the generating module for obtaining a current time value of the one time password token and generating a one time password according to the obtained time value and time step for changing a dynamic factor; and a displaying module for displaying or un-displaying the one time password generated by the generating module.

ADVANTAGES

The solutions are implemented by monitoring the ambient temperature for the one time password token at a fixed time step, and computing the time deviation accumulation at different temperatures according to the characteristic values of an crystal oscillator corresponding to changes in temperature, calibrating the temperature float of the one time password token according to the time deviation at a fixed time step, so as to reduce the time deviation of the one time password token at high or low temperatures greatly.

DETAILED DESCRIPTION OF THE PREFERRED EMBODIMENTS

A detail description will be given to the embodiments of the invention in company with the drawings for a clear purpose, solution and advantages thereof.

Embodiment 1

An embodiment is provided with a method for calibrating the temperature float of a one time password token. Notably, the one time password token in the embodiment stores characteristic values of its 32.768 KHz crystal oscillator at different temperatures, which are oscillator frequencies as shown in Table 1. Data in Table 1 is obtained by repeating test, and for further improvement of test accuracy, temperatures with narrower gap can be selected to test the frequency of the oscillator during a test.

TABLE 1 frequencies (Hz) of a 32.786 KHz crystal oscillator at different temperatures

| | | | | | | | |
|---|---|---|---|---|---|---|---|
| −40° | −35° | −32.8° | −31.5° | −28° | −25.3° | −20° | −17° |
| 32762.2 | 32763 | 32763.1 | 32763.9 | 32764.1 | 32764.7 | 32765 | 32765.7 |
| −3° | 0° | 2° | 9° | 10° | 14° | 19° | 20° |
| 32766.8 | 32767.4 | 32767.45 | 32767.48 | 32767.5 | 32767.6 | 32767.64 | 32767.8 |
| 24° | 25° | 30° | 30.1° | 31.5° | 33.2° | 35° | 40° |
| 32767.95 | 32768 | 32767.89 | 32797.86 | 32767.79 | 32767.66 | 32737.54 | 32767.5 |
| 43° | 44.5° | 47.2° | 50° | 52.3° | 60° | 65° | 70° |
| 32767.42 | 32767.3 | 32767.25 | 32766.16 | 32766.08 | 32766. | 32765.5 | 32765 |
| 72° | 72.8° | 74° | 76.3° | 76.9° | 78° | 78.9° | 80° |
| 32764.8 | 32764.5 | 32784.2 | 32764.15 | 32764.04 | 32764.5 | 32764.66 | 32763.7 |

Figure 1:
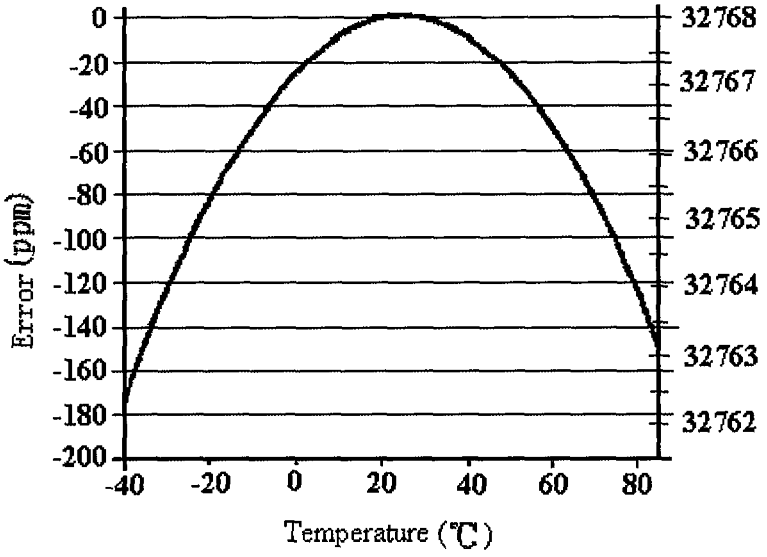
FIG. 1 is a curve graph of a temperature float of a 32.768 KHz crystal oscillator provided in embodiment 1 of the invention.
Figure 2:
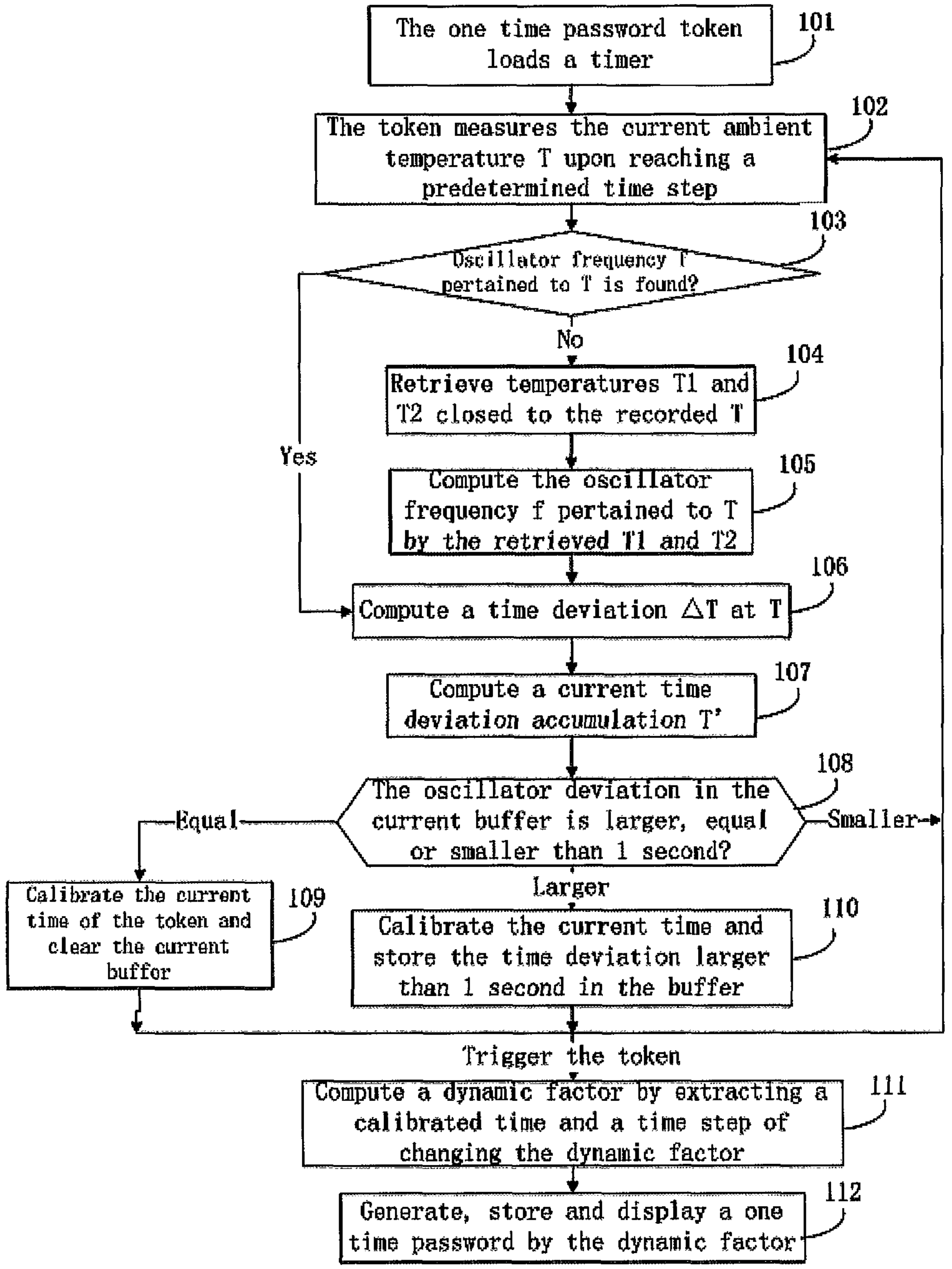
FIG. 2 is a flow chart of a method for calibrating the temperature float of a one time password token provided in embodiment 1 of the invention.

For illustrating a trend of the frequency change of an oscillator at different temperatures, Table 1 is converted into a curve graph, FIG. 1. FIG. 1 reflects a heavy influence of temperature on the oscillator frequency, as a result, the one time password token must be calibrated in terms of its temperature float when being used by a user with following method, as shown in FIG. 2.

Step 101, the one time password token loads a timer, and a timing time of the timer refers to a first predetermined time and is set as required, such as one hour in the embodiment.

Particularly, the timing time of the timer can be set to be 10 minutes or less in case of a big temperature deviation surrounding the one time password token, or one hour or more in case of a small temperature deviation, by which the method not only improves the temperature float accuracy of the one time password token, but also lowers the power loss of it, and thus extends usage life of it.

Step 102, the one time password token measures its current ambient temperature T in case of reaching the predetermined timing time, records it and reloads the timer.

Particularly, the one time password token is outfitted with a thermal resistor inside for measuring its current ambient temperature. The thermal resistor is connected with a high-accuracy resistor which is respectively coupled to a power supply and ground. Value of the thermal resistor changes with ambient temperature surrounding the one time password token, and so is voltage at a junction between the thermal resistor and the high-accuracy resistor. Moreover, an AD converter inside the one time password token is coupled to the junction between the aforesaid resistor, and the one time password token triggers the AD converter, upon retrieving its current ambient temperature, which converts a voltage at the thermal resistor side into a digital signal, and computes the current ambient temperature for the one time password token according to the temperature parameter of the thermal resistor and basic voltage of the AD converter.

In the embodiment, the one time password token measures its current ambient temperature, for example 22 degree centigrade, upon reaching the predetermined timing time, reloads the timer and times the next measure of the temperature surrounding the one time password token.

Furthermore, the one time password token may also determine whether its current ambient temperature is to be measured by retrieving a flag. The determination includes changing the flag, for example from 0 to 1, by a hardware circuit inside the one time password token, retrieving the flag and measuring its current ambient temperature in case of flag=1 by the one time password token.

Step 103, the one time password token retrieves the pre-stored data table according to a recorded temperature T, and determines whether an oscillator frequency f pertained to T is retrieved from the data table;

if yes, Step 106 is executed;

if not, Step 104 is executed.

Step 104, the one time password token obtains two temperature values T1 and T2 close to T by retrieving the pre-stored data table by the recorded T, and for T=22, T1 and T2 are respectively 20 degree centigrade and 24 degree centigrade in Table 1.

Step 105, the one time password token retrieves the oscillator frequencies f1 and f2 pertained to T1 and T2 respectively from the data table, and computes the oscillator frequency f pertained to T on basis of T1, T2, f1 and f2 with a formula $$\frac{T-T1}{T2-T1}=\frac{f-f1}{f2-f1}.$$

In the embodiment, the oscillator frequencies f1 and f2 are obtained by T1 and T2 respectively in Table 1, recorded as $$a=(T1,f1)=(20°,32767.5\text{ Hz}),$$

$$b=(T2,f2)=(24°,32767.95\text{ Hz})\text{ and}$$

$$T=22°,\text{ and}$$

then f, 32767.95 Hz, is obtained by introducing the aforesaid data into the above formula. Specifically, the oscillator frequency 32765 Hz may be correspondingly retrieved from the data table in case of T=−20 is measured at Step 102.

Step 106, the one time password token computes a time deviation ΔT of the oscillator at temperature T.

It is specifically completed by computing a frequency deviation Δf of the oscillator at T and converting it into a time deviation Δt by the one time password token. Notably, the time deviation Δt is a time deviation within the current 1 second, while the time deviation ΔT at temperature T further includes a time deviation within a predetermined timing time, and thus ΔT is a value obtained by Δt*timing time within the current 1 second adding to the time deviation within the current 1 second. Finally, the one time password token stores ΔT in its temporary buffer.

Specifically, Δf and Δt are obtained by formula as follows.

$$\Delta f=f-\text{standard oscillator frequency;}$$

$$\Delta t=\Delta f/f(\text{second});$$

The standard oscillator frequency is a frequency of oscillator at ambient temperature (25 degree centigrade), which is specifically 32.768 KHz for the 32.768 KHz oscillator in the embodiment.

$$\Delta t = \frac{f - \text{standard oscillator frequency}}{f} = \frac{32767.95 - 32768}{32767.95} = -1.5 * 10^{-6}\text{second}$$

The time deviation of the oscillator at T is ΔT=−1.5*10⁻⁶*3601 second, which means that the current time at T is slower than the standard time for 1.5*10⁻⁶*3601 second.

Step 107, the one time password token computes a current time deviation accumulation T' according to the obtained time deviation ΔT and stores it in a temporary buffer.

The above computing process is a process of accumulation, viz., the current time deviation accumulation T' may be obtained by adding the current time deviation ΔT to that time deviation upon reaching the previous timing time.

For example, the time deviation ΔT is −1.5*10⁻⁶*3601 second when reaching the current timing time, and the time deviation ΔT for the last two times are −0.75*10⁻⁶*3600 second and −1.15*10⁻⁶*3600 second respectively, and so the current time deviation accumulation is (−0.75*10⁻⁶*3601 second)+(−1.15*10⁻⁶*3601 second)+(−1.5*10⁻⁶*3601 second) which is stored in the temporary buffer as a basis value for the next computing.

Step 108, the one time password token determines whether the current time deviation accumulation T' in the current buffer is larger, equal or smaller than a predetermined value, for example one second in the embodiment;

if equal, Step 109 is executed;

if larger, Step 110 is executed; and if smaller, Step 102 is executed.

Step 109, the one time password token calibrates the current time inside of it, and clears the current buffer, viz., sets the current time deviation accumulation to be zero, and Step 102 is executed.

The one time password token adds 1 second to the current time to obtain a calibrated time and clears the buffer.

Step 110, the one time password token calibrates the current time inside of it, and deducts 1 second from the current time accumulation T' to obtain a time value and stores it into a temporary buffer as a basis value for the next accumulation, and then Step 102 is executed.

Particularly, the calibrated time is obtained by adding 1 second to the current time by the one time password token.

The calibrated time is obtained by adding 1 second to the current time by the one time password token both at Step 209 and Step 210 because, as shown in FIG. 1, a temperature float curve graph, the oscillator frequency is at its maximum at 25 degree centigrade, and smaller at any other temperature, this is that the real frequency of the oscillator is equal or smaller than the standard frequency. Therefore, compared with the standard frequency, if the vibration times of the oscillator is smaller than the standard one within one second, with a deviation Δf, a deviation between the real vibration time and the standard one of the oscillator is Δf/f second viz. the real vibration time is smaller than the standard one of the oscillator for Δf/f second. Thus, the calibration can be completed by adding 1 second to the current time of the one time password token upon the accumulation of the deviation Δf/f second reaching 1 second.

Step 111, triggering the one time password token, extracting the calibrated current time value and changing time step of the dynamic factor, and obtaining the dynamic factor according to them.

Notably, the time-based one time password token selects time as a dynamic factor and computes the current time factor and static factor with some password-generating algorithm. Generally, 60 second or 30 second is selected as a time step of changing dynamic factor. Before leaving a factory, the one time password token has been set a start time for computing the dynamic factor and a time step for changing it. For example, the start time for computing the dynamic factor is 0 second, 0 minute, 0 hour, Jan. 1, 2010 and the time step is 60 second.

Formula for computing the dynamic factor is $$\frac{\text{Extracted current time value} - \text{Start time}}{\text{Timing step for changing the dynamic factor}}$$

Step 112, the one time password token generates and displays a one time password according to the obtained dynamic factor by computation.

Especially, the one time password token generates and displays a one time password according to the obtained dynamic factor, a pre-stored static factor, and a password-generating algorithm.

The embodiment completes the calibration of the time deviation of the oscillator resulted from a temperature float with a one time password token application, and correspondingly improves the calibration accuracy by changing the application rather than adding one or more hardware chips. It is flexible, easy for updating, and narrows the time deviation resulted from the temperature float derived from a one time password token at a high temperature.

Besides, the time calibrating may also be completed by integrating a digital time-accuracy calibrating circuit into the real time clock, writing the computed frequency deviation Δf into a register of the time-accuracy calibrating circuit by the one time password token, and calibrating the time deviation resulted from a temperature float according to the written frequency deviation Δf by the register.

Correspondingly, the Step 106-110 may be replaced with following Step 106'.

Step 106': the one time password token writes an oscillator frequency f into the real time clock and according to it the real time clock calibrates the current time value.

In details, the real time clock is integrated with a digital time-accuracy calibrating circuit for writing an oscillator frequency f into a calibration value and correspondingly calibrating the time accuracy of the clock, viz. changing pulse count within 1 second.

The converting the written oscillator frequency f into a calibration value includes that in case that the oscillator frequency is equal to a standard one, the calibration value is 0, +1, −64, −63 or default without changing the pulse count within 1 second; or in case that the oscillator frequency is smaller than the standard one, the pulse count within 1 second is reduced and the calibration value is calculated in such a way that $$\text{Calibration value} = \frac{\dfrac{\text{Oscillator frequency } f - \text{Standard oscillator frequency}}{\text{Oscillator frequency}*2}}{\text{Standard oscillator frequency}*20} = (\text{Oscillator frequency } f - \text{Standard oscillator frequency})*20.$$

It is illustrated in FIG. 1 that the oscillator frequency is smaller than or equal to a standard one at high temperature, and therefore the embodiment eliminates the exception that the oscillator frequency is larger than the standard one.

Specifically, the digital time calibrating circuit changes the pulse count within current 1 second at the $20^{th}$ second every 1 minute for the calibration.

The above method for calibrating the temperature float of the one time password token is implemented by integrating a high-accuracy digital time accuracy calibrating circuit into the one time password token, it is simple, with high-accuracy, and narrows the time deviation of the one time password token at high or low temperature resulted from a temperature float.

In this embodiment, the one time password token may also only store frequencies of the related oscillator at different temperatures in case of another oscillator is used, such as a 32 KHz one, with the above description.

Moreover, the real time clock may record time and date through second count, and the current time and date are stored in a register group, and a basic frequency 1 Hz is generated by a frequency-division by a 32.768 KHz oscillator to refresh the time and date. The time deviation will be 1 second in case of the second count, so great a deviation, and thus another improved counting method, second floating point counting, may be used to record time and date in this embodiment, which calibrates the time deviation resulted by a temperature float, and the floating point accuracy is $10^{-6}$.

Thus Steps 107-110 can replaced with steps of writing the computed time deviation □T into a circuit register, which is a floating point register, and in which the floating point accuracy item will accumulate according to the written time deviation each time and automatically carries in case of a full accumulation. The new steps change the current Real time clock count and calibrate the time deviation resulted from the temperature float.

An example is given for explaining the use of the floating point counting method to calibrate a time deviation resulted from a temperature float. Write time deviations $1.5*10^{-6}$, $1.54*10^{-6}$ and $2.0*10^{-6}$ successively into a register upon reaching a first timing time, a second timing time and a third timing time respectively. Response to the written time deviation, the value in the floating point accuracy item will be $1.5*10^{-6}$, $1.5*10^{-6}+1.54*10^{-6}$, $1.5*10^{-6}+1.54*10^{-6}+2.0*10^{-6}$, $1.5*10^{-6}+1.54*10^{-6}+2.0*10^{-6}+\ldots,\ldots,$ when it is larger than or equal to 1, the value will carry 1 toward the second bit. For example, the Real time clock will add 1 automatically in case that the value in the floating point accuracy item is $100005*10^{-6}$, and the value in the floating point accuracy item will be $0.5*10^{-6}$, while at the next timing the written time deviation is $3.6*10^{-6}$ and correspondingly the value in the floating point accuracy item will be $0.5*10^{-6}+3.6*10^{-6}$.

Embodiment 2

Another embodiment is provided for calibrating the temperature float of a one time password token.

Notably, the embodiment provides characteristic values pertained to an oscillator at a frequency of 32.768 KHz inside the one time password at different temperatures, that are frequency stabilities as shown in Table 2 obtained by repeating tests, and for further improvement of the test accuracy, temperatures with narrower gap can be used to test the oscillator frequency in another test.

The frequency stability refers to size of change in the oscillator frequency in range of working temperatures of the oscillator, measured in ppm. 1 ppm=$1*10^{-6}$ second.

Especially, 1 ppm refers to one in a million of change in frequency of the oscillator in times of one degree centigrade change in temperature, viz. the frequency deviation=(1/1*106)*valued frequency of oscillator.

TABLE 2 frequency stabilities of a 32.786 KHz oscillator at different temperatures (ppm)

| | | | | | | | |
|---|---|---|---|---|---|---|---|
| −40° | −35° | −32.8° | −31.5° | −28° | −25.3° | −20° | −17° |
| −175 | −153.34 | −147.2 | −146.67 | −115 | −105.23 | −95 | −75 |
| −3° | 0° | 2° | 9° | 10° | 14° | 19° | 20° |
| −40 | −30 | −22.5 | −15.85 | −15 | −8.65 | −6.45 | −1.5 |
| 24° | 25° | 30° | 30.1° | 31.5° | 33.2° | 35° | 40° |
| −0.76 | 0 | −1.5 | −1.95 | −2.15 | −3.65 | −5 | −16.4 |
| 43° | 44.5° | 47.2° | 50° | 52.3° | 60° | 65° | 70° |
| −20.45 | −22 | −29.8 | −37.85 | −40 | −60 | −80 | −95 |
| 72° | 72.8° | 74° | 76.3° | 76.9° | 78° | 78.9° | 80° |
| −107 | −108.5 | −113.2 | −125.8 | −126.5 | −130 | −132.6 | −135 |

Figure 3:
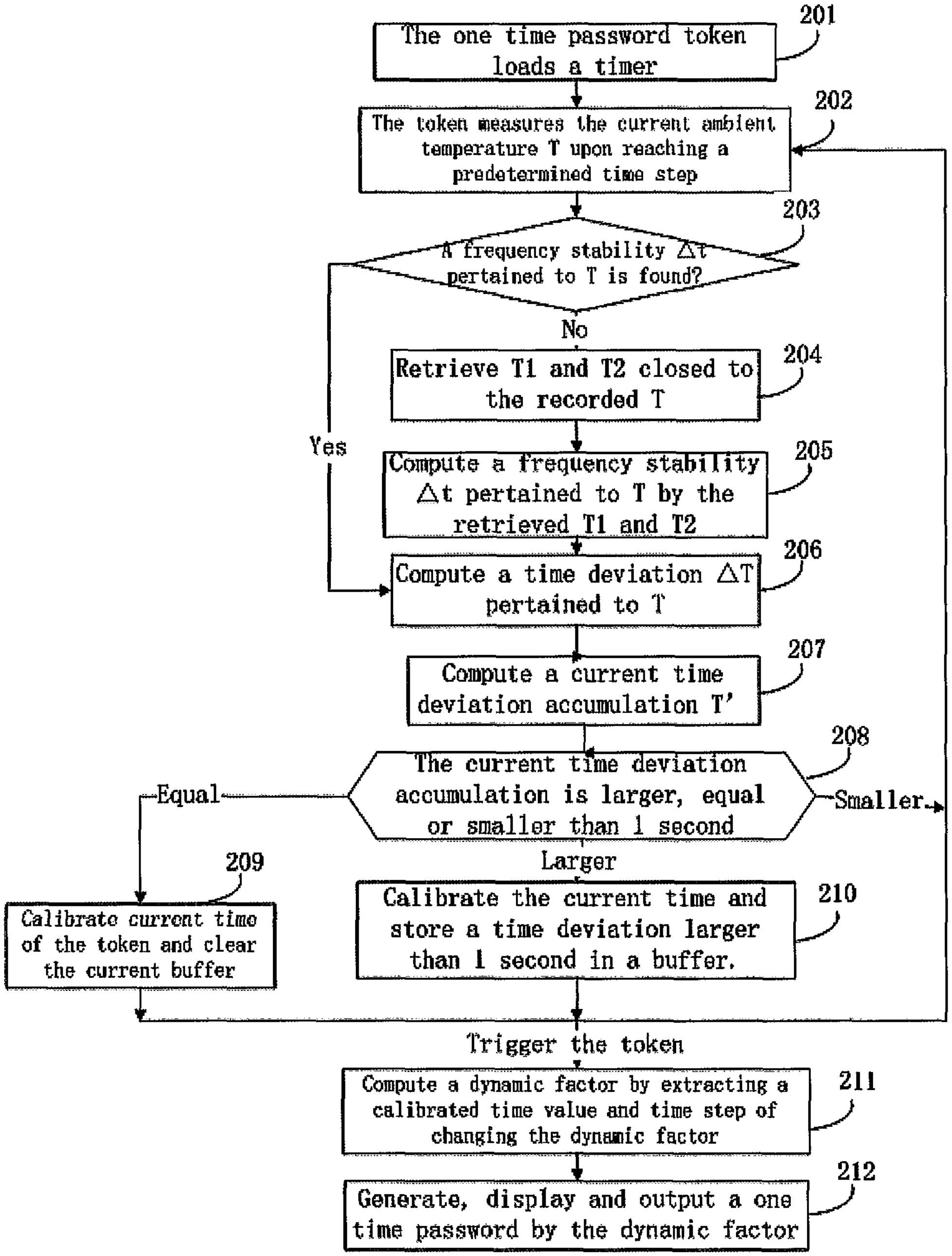
FIG. 3 is a flow chart of another method for calibrating the temperature float of a one time password token provided in embodiment 2 of the invention.

For illustrating the trend of the change in frequency of an oscillator directly with temperatures, the Table 2 is converted into a curve graph, FIG. 1. FIG. 1 reflects the heavy influence of the temperature on the oscillator frequency, as a result, the one time password token must be calibrated in terms of its temperature float when being used by a user with a following method, as shown in FIG. 3.

Step 201, the one time password loads a timer, and the timing time of it refers to a first predetermined time which can be set as required, such as 30 minute in the embodiment.

Particularly, the timing time for the timer can be set to be 10 minutes or less in case of a big temperature deviation surrounding the one time password token, or one hour or more in case of a small temperature deviation, and so the method not only improves the temperature float accuracy of the one time password token, but also lowers the power loss of it, and thus extends usage life of it.

Step 202, the one time password token measures its current ambient temperature T in case of reaching the timing time, records it and reloads the timer.

Particularly, the one time password token is outfitted with a built-in thermal resistor for measuring its current ambient temperature. Specifically, the thermal resistor is connected to a high-accuracy resistor which is respectively coupled to a power supply and ground. Value of the thermal resistor changes with the ambient temperature of the one time password token, and so does the voltage at the junction between the aforesaid two resistors. An AD converter inside the one time password token is also connected to the junction between the aforesaid two resistors. Upon reaching the timing time, the one time password token measures its current temperature, initiates the AD converter to convert the voltage at the thermal resistor side into a digital signal, and computes the current ambient temperature according to the temperature parameter of the thermal resistor and basic voltage of AD.

In the embodiment, the one time password token measures its current ambient temperature, for example 32 degree centigrade, upon reaching the timing time, reloads the timer and times the next measure of the temperature surrounding the one time password token.

Furthermore, the one time password token may also determine whether its current ambient temperature is to be measured by retrieving a flag. The determination includes steps of changing the flag, for example from 0 to 1, by a hardware circuit inside the one time password token, retrieving the flag, and measuring the current ambient temperature in case of flag=1 by the one time password token.

Step 203. the one time password token retrieves the prestored data table according to a recorded temperature T, determines whether a frequency stability Δt pertained to T is retrieved from the data table, and stores the retrieved frequency stability Δt in a buffer, and then Step 106 is executed in case of a positive determination result, or Step 204 is executed in case of a negative determination result.

Step 204, the one time password token obtains two temperature values T1 and T2 close to T, in the data table by retrieving a data table according to the recorded T.

For T=32 degree centigrade, T1 and T2 close to it are 31.2 degree centigrade and 33.2 degree centigrade respectively in Table 2.

Step 205, the one time password token retrieves the frequency stabilities Δt1 and Δt2 pertained to T1 and T2 respectively from the data table, and computes the frequency stability Δt pertained to T on basis of T1, T2, Δt 1 and Δt 2.

The frequency stability Δt pertained to T on basis of T1, T2, Δt 1 and Δt 2 is computed with a formula $$\frac{T - T1}{T2 - T1} = \frac{\Delta t - \Delta t1}{\Delta t2 - \Delta t1}.$$

In the embodiment, the oscillator frequencies Δt1 and Δt2 are obtained by T1 and T2 respectively in the Table 2, recorded as a=(T1, Δt 1)=(31.5°, −2.15 ppm), b=(T2, Δt2)=(33.2°, −3.65 ppm) and T=32°, and then Δt, −1.52 ppm, is obtained by computing the recorded data with the above formula.

Specifically, in the embodiment, the time deviation −95 ppm may be correspondingly retrieved from the data table in case that T=−20 degree centigrade is measured at Step 202.

Step 206, the one time password token computes its time deviation ΔT at temperature T.

Specifically, the one time password token computes its time deviation ΔT at T according to the frequency stability Δt with steps as follows. The one time password token converts the frequency stability into a time value on a microsecond time scale, which is a time deviation within the current 1 second, and the current time deviation further includes a time deviation within the timing time, and therefore the time deviation ΔT of the token at temperature T is obtained by time value*timing time+time deviation within the current 1 second and is stored in a temporary buffer.

In the embodiment, the time deviation ΔT of the token at temperature T is $-1.52*10^{-6}*1801$ second.

Step 207, the one time password token computes the current time deviation accumulation T'.

The computing step is a process of accumulation, viz., the current time deviation accumulation T' may be obtained by adding the current time deviation ΔT to the time deviation upon reaching the previous timing time.

For example, the time deviation ΔT is $-1.52*10^{-6}*1801$ second upon reaching the current timing time, and time deviations ΔT for the last two times are $-0.75*10^{-6}*1801$ second and $-1.15*10^{-6}*1801$ second respectively, and so the current time deviation accumulation is $(-0.75*10^{-6}*1801$ second$)+(-1.15*10^{-6}*1801$ second$)+(-1.5*10^{-6}*1801$ second$)$ which is stored in a temporary buffer as a basis value for the next time computing.

Step 208, the one time password token determines whether the current time deviation accumulation in the current buffer is larger, equal or smaller than a predetermined value, such as 1 second in the embodiment;

if equal, Step 209 is executed;

if larger, Step 210 is executed; and if smaller, Step 202 is executed.

Step 209, the one time password token calibrates its current time, clears the current buffer, viz., sets the current time deviation accumulation to be zero, and Step 202 is executed.

The step specifically is that the one time password token adds 1 second to the current time to obtain a calibrated time and clears the time deviation in the buffer.

Step 210, the one time password token calibrates its current time, deducts 1 second from the current time deviation accumulation T' to obtain a time value and stores it into a temporary buffer as a basic value for the next accumulation, and then Step 202 is executed.

Specifically, the calibrated time is obtained by adding 1 second to the current time by the one time password token.

Particularly, the calibrated time is obtained by adding 1 second to the current time by the one time password token, both at Step 209 and Step 210 because, as shown in FIG. 1, a temperature float curve graph, the frequency stability of the oscillator is 0 at 25 degree centigrade while it is a minus value changing at any other temperature. It is a sign that the oscillator is slower than the standard time for $\Delta t*10^{-6}$ second within the current 1 second, and therefore the calibration can be implemented by adding 1 second to the current time of the one time password token in case that 1 second is accumulated by more time deviations $\Delta t*10^{-6}$ seconds.

Step 211, trigger the one time password token, extract the calibrated current time value and time step of changing the dynamic factor, and obtain the dynamic factor according to them.

Notably, the time-based one time password token selects time as a dynamic factor and computes the current time factor and static factor with some password-generating algorithm. Generally, 60 second or 30 second is selected as the time step of changing the dynamic factor. Before leaving a factory, the one time password token has been set a start time for computing the dynamic factor and a time step of changing it. For example, the start time for computing the dynamic factor is 0 second, 0 minute, 0 hour, Jan. 1, 2010, and the time step of changing it is 60 second.

The formula for computing the dynamic factor is (the extracted current time value−the start time)/the time step of changing the dynamic factor.

Step 212, the one time password token generates and displays a one time password according to the obtained dynamic factor.

The one time password token generates and displays a one time password according to the obtained dynamic factor, the pre-stored static factor, and the password-generating algorithm.

The embodiment completes calibration of the time deviation of the oscillator resulted from a temperature float with a one time password token application, and the calibration accuracy can be improved by changing the application rather than adding one or more hardware chips. It is flexible, easy for update, and narrows the time deviation resulted from the temperature float derived from a one time password token at a high temperature.

Besides, the time calibrating may also be completed by integrating a digital time-accuracy calibrating circuit inside the REAL TIME CLOCK, writing the retrieved frequency stability Δt into a register inside the time-accuracy calibrating circuit by the one time password token, and calibrating the time deviation resulted from a temperature float according to the written frequency stability Δt by the register.

Correspondingly, the Steps 206-210 may by replaced with Step 206'.

Step 206': the one time password writes the frequency stability □t into REAL TIME CLOCK, and according to it, the REAL TIME CLOCK calibrates the current time value.

In details, the REAL TIME CLOCK is integrated with a digital time-accuracy calibrating circuit for writing the time deviation Δt into a register, and the register calibrates the time accuracy of the clock according to the time deviation Δt.

Particularly, the digital time-accuracy calibrating circuit calibrates the clock time by changing the count of the clock pulse within the current 1 second at the $20^{th}$ second of every 1 minute according to the written frequency stability.

In this embodiment, the one time password may also only store frequencies of the related oscillator at different temperatures in case of another oscillator is used, such as a 32 KHz one, with the above description.

Embodiment 3

The embodiment provides a method for calibrating a temperature float of a one time password token. Notably, the embodiment provides characteristic values of a 32.768 KHz crystal oscillator inside the one time password token at different temperatures, that are time deviations as shown in Table 3 obtained by repeating tests, and for further improvement of the test accuracy, temperatures with narrower gap can be used to test the oscillator frequency in another test.

The time deviation is a time deviation of the one time password token upon reaching a preset timing time.

TABLE 3

Frequencies of a 32.786 KHz oscillator at different temperatures (μs)

| | | | | | | | |
|---|---|---|---|---|---|---|---|
| −40° | −35° | −32.8° | −31.5° | −28° | −25.3° | −20° | −17° |
| −5250 | −4600.2 | −4416 | −4400.1 | −3450 | −3156.9 | −2850 | −2250 |
| −3° | 0° | 2° | 9° | 10° | 14° | 19° | 20° |
| −1200 | −900 | −675 | −475.5 | −450 | −259.5 | −193.5 | −45 |
| 24° | 25° | 30° | 30.1° | 31.5° | 33.2° | 35° | 40° |
| −22.8 | 0 | −45 | −58.5 | −67.5 | −109.5 | −150 | −492 |
| 43° | 44.5° | 47.2° | 50° | 52.3° | 60° | 65° | 70° |
| −613.5 | −660 | −849 | −1135.5 | −1200 | −1800 | −2400 | −2850 |
| 72° | 72.8° | 74° | 76.3° | 76.9° | 78° | 78.9° | 80° |
| −3210 | −3255 | −3396 | −3774 | −3795 | −3900 | −3978 | −4050 |

Figure 4:
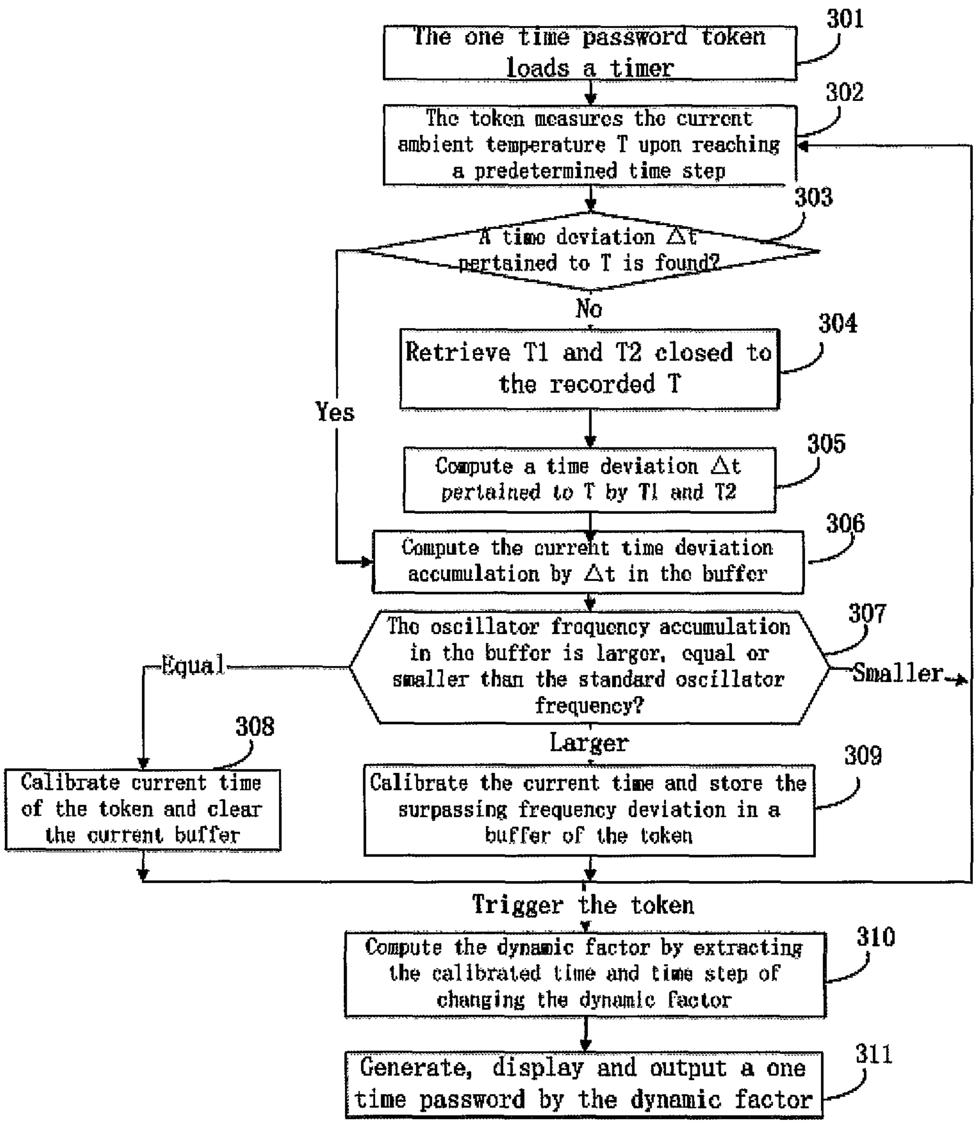
FIG. 4 is a flow chart of another method for calibrating the temperature float of a one time password token provided in embodiment 3 of the invention.

FIG. 4 is a flow chart of the method provided in embodiment 3.

Step 301, the one time password loads a timer and sets a timing time for it, this means that a first predetermined value can be set as required, such as 30 minutes in the embodiment.

Particularly, the timing time for the timer can be set to be 10 minutes or less in case of a big temperature difference surrounding the one time password, or one hour or more in case of a small temperature difference, it not only improves the temperature float accuracy of calibrating the one time password, but also lowers the power loss of it, and thus extends usage life of it.

Step 302, the one time password token measures the current ambient temperature T upon reaching the predetermined timing time and records it, and reloads the timer.

Particularly, the one time password token is outfitted with a built-in thermal resistor for measuring its current ambient temperature. The thermal resistor is connected to a high-accuracy resistor which is respectively coupled to a power supply and ground. Value of the thermal resistor is different with change in temperature surrounding the one time password token, and so is the voltage at a junction between the thermal resistor and the high-accuracy resistor. Moreover, an AD converter inside the one time password token is coupled to the junction between the thermal resistor and the high-accuracy resistor, and the one time password token triggers the AD converter, upon measuring its current ambient temperature, which converts a voltage at the thermal resistor side into a digital signal, and computes the current temperature surrounding the one time password token according to the temperature parameter of the thermal resistor and basic voltage of the AD converter.

In the embodiment, the one time password token measures a current ambient temperature T, for example 22 degree, upon reaching the predetermined timing time, reloads the timer and times the next measure of the temperature surrounding the one time password.

Furthermore, the one time password token may also determine whether the current ambient temperature needs to be measured by retrieving a flag. It is implemented by changing the flag, such as from 0 to 1, by a hardware circuit inside the one time password token, retrieving the flag and measuring the current ambient temperature in case of 1 in the flag item by the one time password token.

Step 303, the one time password token retrieves a pre-stored data table according to a recorded temperature T, determines whether a time deviation ΔT pertained to T is obtained from the data table, and Step 306 is executed in case of a positive determination result, or Step 304 is executed in case of a negative determination result.

Step 304, the one time password token obtains two temperature values T1 and T2 close to T, in the data table by retrieving the pre-stored data table by the recorded T.

Specifically in the embodiment, for T=22 degree centigrade, T1=20 degree centigrade and T2=24 degree centigrade can be obtained from data stored in Table 1.

Step 305, the one time password token retrieves time deviations ΔT1 and ΔT2 pertained to T1 and T2 respectively from the data table and computes the time deviation ΔT pertained to T.

The time deviation ΔT pertained to T is computed on basis of T1, T2, ΔT1 and ΔT2 with a formula $$\frac{T-T1}{T2-T1}=\frac{\Delta T-\Delta T1}{\Delta T2-\Delta T1}.$$

In the embodiment, the oscillator frequencies ΔT1 and ΔT2 are obtained by T1 and T2 respectively in the data table, recorded as a=(T1, ΔT1)=(20 degree centigrade, −45 μs), b=(T2, ΔT2)=(24 degree centigrade, −22.8 μs) and T=22, and then ΔT, −22.8 μs, is obtained by computing the recorded data with the above formula.

Specifically in the embodiment, if T=−20 degree centigrade is measured at Step 302, the time deviation −2850 μs may be correspondingly retrieved from the data table.

Step 306, the one time password token computes the current time deviation accumulation T' according to the time deviation ΔT and stores it in a temporary buffer inside.

The computing at Step 306 is a process of accumulation, viz., the current time deviation accumulation T' may be obtained by adding the current time deviation ΔT to the time deviation upon reaching the previous timing time by the one time password token.

For example, the time deviation ΔT is $-22.8*10^{-6}$ second when reaching the current timing time, and time deviations ΔT for the previous two timing times are respectively 0 and $-45*10^{-6}$ second, and so the current time deviation accumulation is $(-22.8*10^{-6}$ second)+(0 second)+$(-45*10^{-6}$ second) which is stored in a temporary buffer as a basis value for the next time computing.

Step 307, the one time password token determines whether the current time deviation accumulation T' in the current buffer is larger, equal or smaller than a predetermined value, for example one second in the embodiment;

if equal, Step 308 is executed;

if larger, Step 309 is executed; and if smaller, Step 302 is executed.

Step 308, the one time password token calibrates current time inside of it and clears the current buffer, viz., sets the current time deviation accumulation to be zero, and returns to Step 302.

Specifically, the one time password token adds 1 second to the current time to obtain a calibrated time and clears the buffer.

Step 309, the one time password token calibrates the current time inside of it, and deducts 1 second from the current time accumulation T to obtain a time value and stores it into a temporary buffer as a basis value for the next accumulation, and then Step 302 is executed.

Particularly, the calibrated time is obtained by adding 1 second to the current time by the one time password token.

The calibrated time is obtained by adding 1 second to the current time by the one time password token both at Step 308 and Step 309 because, as shown in Table 3, there is a time deviation for the real time clock oscillator at any temperature except for 25 degree centigrade which is smaller than the standard time value, and therefore the calibration can be implemented by adding 1 second to the current time of the one time password token in a time the deviation Δf/f is accumulated to 1 second.

Step 310, trigger the one time password token, extract the calibrated current time value and time step of changing the dynamic factor and obtain the dynamic factor according to them.

Notably, the time-based one time password token selects time as a dynamic factor and computes the current time factor and static factor with some password-generating algorithm. Generally, 60 second or 30 second is selected as a time step of changing the dynamic factor. Before leaving a factory, the one time password token has been set a start time for computing the dynamic factor and a time step of changing it. For example, the start time for computing the dynamic factor is 0 second, 0 minute, 0 hour, Jan. 1, 2010 and the time step of changing it is 60 second.

The formula for computing the dynamic factor is (the extracted current time value−the start time)/the time step of changing the dynamic factor.

Step 311, the one time password token generates and displays a one time password according to the obtained dynamic factor.

Especially, the one time password token generates and displays a one time password according to the obtained dynamic factor, the pre-stored static factor and the password-generating algorithm.

The embodiment completes calibration of the time deviation of the oscillator resulted by a temperature float with a one time password application, and the accuracy of the token can be improved by changing the application rather than adding one or more hardware chips. It is flexible, easy for update, and narrows the time deviation resulted by the temperature float derived from a one time password token at a high temperature.

Embodiment 4

Figure 5:
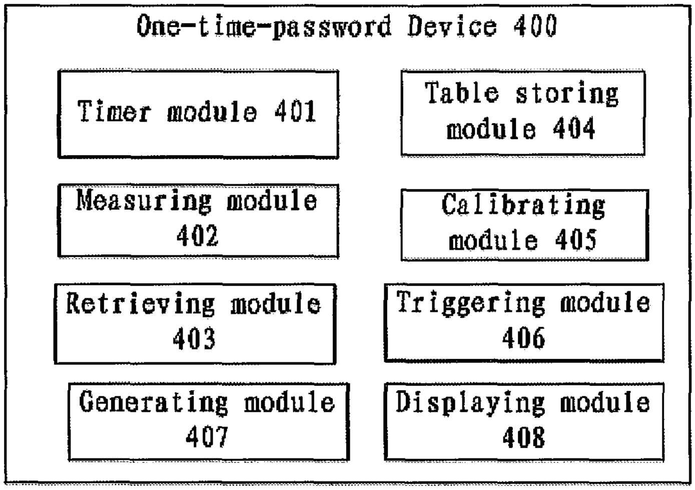
FIG. 5 is a one time password token provided in embodiment 4 of the invention.

As shown in FIG. 5, a one time password token 400 includes a timer module 401, a measuring module 402, a retrieving module 403, a table storing module 404, a calibrating module 405, a triggering module 406, a generating module 407 and a displaying module 408.

The timer module 401 is used for initiating the measuring module 402 to measure a current ambient temperature for the one time password token 400 at intervals.

In the embodiment, the timing time for initiating the timer module 401 may be set as required, for example, ten minutes or one hour, or shorter in case of a big temperature difference surrounding the one time password token, or longer in case of a small temperature difference surrounding the one time password token, which improves the working efficiency of the one time password token along with the calibration accuracy of its temperature float.

The measuring module 402 is used for, in case of reaching a timing time set by the timer module 401, measuring current ambient temperature surrounding the one time password token 400, and initiating the retrieving module 403 to retrieve the table storing module 404 according to the measured temperature.

The retrieving module 403 is used for retrieving a characteristic value corresponding to the current temperature, surrounding the one time password token 400, measured by the measuring module 402 in the table storing module 404.

The table storing module 404 is used for storing characteristic values of the real time clock oscillator at different temperatures.

Specifically, the characteristic values comprise oscillator frequencies or frequency stabilities or time deviations, of the Real-Time Clock oscillator at different temperatures.

The calibrating module 405 is used for calibrating current time of the one time password token 400 according to the characteristic value retrieved by the retrieving module 403.

The triggering module 406 is used for triggering the generating module 407, which is a key, a button or a switch.

The generating module 407 is used for generating a one time password according to the current calibrated time value and includes a dynamic factor generating unit and a one time password generating unit.

The dynamic factor generating unit is used for generating a dynamic factor according to the current time value calibrated by the calibrating module 406.

The one time password generating unit is used for generating the one time password according to the dynamic factor generated by the dynamic factor generating unit.

The displaying module 408 is used for displaying or closing a display of the one time password after it is generated.

Particularly, the retrieving module 403 further includes a retrieving unit for retrieving a characteristic value according to the measured current ambient temperature from the table storing module and determining whether it can be retrieved; and a first computing unit for computing a characteristic value according to data in the table storing module and the measured current ambient temperature in case of a negative determination result.

Particularly, the calibrating module 405 includes a second computing unit for computing a current time deviation accumulation according to the characteristic value obtained by the retrieving module 403, and for computing oscillator frequency deviation and conversing it into a time deviation in case of the characteristic value referring to a frequency of real time clock at different temperatures;

a determination unit for determining whether the time deviation accumulation obtained by the second computing unit reaches a predetermined value; and a first calibrating unit for calibrating the current time of the one time password token 400 according to the predetermined value in case of a positive determination result.

Also, the calibrating module 405 further includes a converting unit for converting the characteristic value obtained by the retrieving module 403 into a calibration value according to a predetermined method, and a second calibrating unit for calibrating the current time value by changing clock count of the clock pulse according to the above calibration value.

The predetermined value is 1 second particularly in the embodiment.

The above mentioned are only preferred embodiments of the invention, not a limitation to it, any modification, substitution and change etc., within the principle of the invention will be protected.

The invention claimed is:

1. A method for calibrating temperature float of a one time password token comprising a crystal oscillator, in which the one time password token generates a dynamic factor according to a time value and a time step for changing the dynamic factor, and generates and displays a one time password according to the dynamic factor, wherein the method comprises steps of measuring an current ambient temperature of the one time password token at one interval of a first predetermined time by the one time password token itself;

retrieving a data table in terms of the measured temperature and obtaining a corresponding characteristic value which is an oscillator frequency of the crystal oscillator of the measured temperature by the one time password token;

computing a time deviation of the crystal oscillator according to the oscillator frequency of the measured temperature; and if a accumulated time deviation is larger than or equal to a predetermined value, calibrating a current time value inside the one time password token according to the oscillator frequency at a other interval of a second predetermined time by the one time password token.

2. The method of claim 1, wherein the first predetermined time is self defined, and taken as the interval at which the current ambient temperature is measured by the one time password token through timing by a timer or flag-inquiring orderly.

3. The method of claim 1, wherein said retrieving a data table by the measured temperature and obtaining a corresponding characteristic value by the one time password token comprises:

retrieving the data table according to the measured temperature, and determining whether a characteristic value corresponding to the measured temperature is found by the one time password token;

if not, computing the characteristic value according to the measured temperature and the data table.

4. The method of claim 3, wherein said computing the characteristic value according to the measured temperature and the data table comprises:

retrieving the data table for the first temperature and second temperature, and characteristic values corresponding to them respectively according to the measured temperature, and computing the characteristic value corresponding to the measured temperature with a first predetermined formula according to the above measured data and the measured temperature by the one time password token;

where the first predetermined formula is $$\frac{\text{Measured temperature} - \text{First temperature}}{\text{Second temperature} - \text{First temperature}} = \frac{\text{Characteristic value} - \text{First characteristic value}}{\text{Second characteristic value} - \text{First characteristic value}}.$$

5. The method of claim 1, wherein the data table is prestored in the one time password token;

the data in the data table refers to a crystal oscillator frequency at different temperatures, a frequency stability of the crystal oscillator at different temperatures, or a time deviation within the first predetermined time of the crystal oscillator at different temperatures, in which a crystal is employed in the crystal oscillator provided in the one time password token; and thus the characteristic value corresponding to the measured temperature refers to the crystal oscillator frequency, the frequency stability, or the time deviation within the first predetermined time.

6. The method of claim 5, wherein in case of the characteristic value being the time deviation within the first predetermined time, setting a second predetermined time as a timing step and calibrating the current time value according to the characteristic value by the one time password token comprises:

in case of reaching the second predetermined time, adding the time deviation within the first predetermined time to a prior time deviation within the first predetermined time when reaching the second predetermined time, to obtain a current time deviation accumulation by the one time password token;

determining whether the current time deviation accumulation is smaller, equal or larger than a predetermined value by the one time password token, if smaller, returning to the step of measuring the current ambient temperature for the one time password token by taking the first predetermined time as the step;

if equal, obtaining a calibrated time value by adding the current time value of the one time password token to the predetermined value, and setting the current time deviation accumulation to be zero; and if larger, obtaining a calibrated time value by adding the current time value of the one time password token to the predetermined value, and taking a surpassing part of the current time deviation accumulation over the predetermined value as a base number for the next accumulation.

7. The method of claim 5, wherein in case of the characteristic value referring to the crystal oscillator frequency, taking the second predetermined time as the timing step and calibrating the current time value of the one time password token according to the characteristic value comprises computing an oscillator frequency deviation at the ambient temperature according to the oscillator frequency and a standard frequency by the one time password token;

converting the obtained oscillator frequency deviation into a time value, a time deviation within a current 1 second, by the one time password token;

according to the time deviation within the current 1 second, obtaining a time deviation within the first predetermined time by computing with a second predetermined formula by the one time password token;

in case of reaching the second predetermined time, obtaining a current time deviation accumulation of the one time password token by adding the current time deviation within the first predetermined time to the prior time deviation within the first predetermined time when reaching the second predetermined time by the one time password token;

determining whether the current time deviation accumulation is smaller, equal or larger than a predetermined value by the one time password token, if smaller, returning to the step of measuring the current ambient temperature for the one time password token by taking the first predetermined time as the timing step;

if equal, obtaining a calibrated time value by adding a current time value to the predetermined value, and setting the current time deviation accumulation to be 0; and if larger, obtaining a calibrated time value by adding the current time value to the predetermined value, and taking a surpassing part of the current time deviation accumulation over the predetermined value as a base number for the next accumulation.

8. The method of claim 7, wherein the second predetermined formula is $$\text{a time deviation within the first predetermined time step} = \frac{\text{Frequency deviation}}{\text{Standard frequency of oscillator}} * (1 + \text{the first predetermined time}).$$

9. The method of claim 7, wherein the first predetermined time is the same as the second predetermined time.

10. The method of claim 5, wherein in case of the characteristic value referring to the frequency stability, taking the second predetermined time as the timing step and calibrating the current time value according to the characteristic value by the one time password token comprises:

converting the frequency stability into a time value, which refers to a time deviation within a current 1 second, by the one time password token;

obtaining the time deviation within the first predetermined time by computing with a third predetermined formula according to the time deviation during the current 1 second by the one time password token;

in case of reaching the second predetermined time, obtaining a current time deviation accumulation for the one time password token by adding the current time deviation within the first predetermined time to the prior time deviation within the first predetermined time when reaching the second predetermined time;

determining whether the current time deviation accumulation is smaller, equal or larger than a predetermined value by the one time password token, if smaller, returning to the step of measuring the current ambient temperature for the one time password token by taking the first predetermined time as the timing step;

if equal, obtaining a calibrated time value by adding the current time value to the predetermined value, and setting the current time deviation accumulation to be 0; and if larger, obtaining a calibrated time value by adding the current time value to the predetermined value, and taking a surpassing part of the current time deviation accumulation over the predetermined value as a base number for the next accumulation.

11. The method of claim 10, wherein the third predetermined formula is $$\text{the first predetermined time step} = \text{the frequency stability} * (1 + \text{the first predetermined time}) * 10^{-6}.$$

12. The method of claim 10, wherein the first predetermined time is the same as the second predetermined time.

13. The method of claim 1, wherein calibrating the current time value inside the one time password token according to the characteristic value at the interval of the second predetermined time comprises:

converting the characteristic value into a calibration value upon reaching the second predetermined time by the one time password token;

writing the calibration value into a time calibrating register by the one time password token; and changing clock count of a current clock pulse to calibrate the current time value according to the calibration value upon reaching the second predetermined time by the time calibrating register.

14. The method of claim 13, wherein the second predetermined time is 1 minute.

15. A one time password token comprising a crystal oscillator, wherein the token comprises:

a non-transitory computer readable medium having computer software modules executed by the token, the computer software modules comprising:

a timer module for starting a measuring module for measuring a current ambient temperature for the one time password token when reaching a first predetermined time;

the measuring module for measuring the current ambient temperature for the one time password token, at a time when the timer module accumulates to the first predetermined time, and triggering a retrieving module for retrieving data;

a table storing module for storing characteristic values of a real-time clock crystal oscillator at different temperatures;

the retrieving module for retrieving a characteristic value relating to the measured temperature in the table storing module according to the current ambient temperature of the one time password token measured by the measuring module;

a calibrating module for calibrating a current time value inside the one time password token according to the characteristic value;

a triggering module for triggering a generating module to generate a one time password;

the generating module for obtaining a current time value of the one time password token and generating a one time password according to the obtained time value and time step for changing a dynamic factor; and a displaying module for displaying or un-displaying the one time password generated by the generating module.

16. The one time password token of claim 15, wherein the retrieving software module comprises a retrieving unit for retrieving the characteristic value corresponding to a measured temperature in the table storing software module according to the temperature measured by the measuring software module; and a computing unit for computing the characteristic value relating to the measured temperature in case that a negative retrieving result is obtained by the retrieving unit.

17. The one time password token of claim 15, wherein the calibrating software module comprises a second computing unit for computing a current time deviation accumulation of the one time password token according to the characteristic value obtained by the retrieving software module;

a determining unit for determining whether the current time deviation accumulation obtained by the second computing unit is a predetermined value; and a first calibrating unit for obtaining a calibrated time value by adding the current time value of the one time password token to the predetermined value in case that a positive result is obtained by the determining unit.

18. The one time password token of claim 15, wherein the calibrating software module further comprises a converting unit for converting the characteristic value obtained by the retrieving software module into a calibration value, and a second calibrating unit for calibrating a current time value by changing a clock count of current clock pulse of the one time password token according to the calibration value.

19. The one time password token of claim 15, wherein the characteristic value corresponding to the measured temperature comprises a crystal oscillator frequency, a frequency stability, or a time deviation within the first predetermined time step.

* * * * *